UNITED STATES PATENT OFFICE.

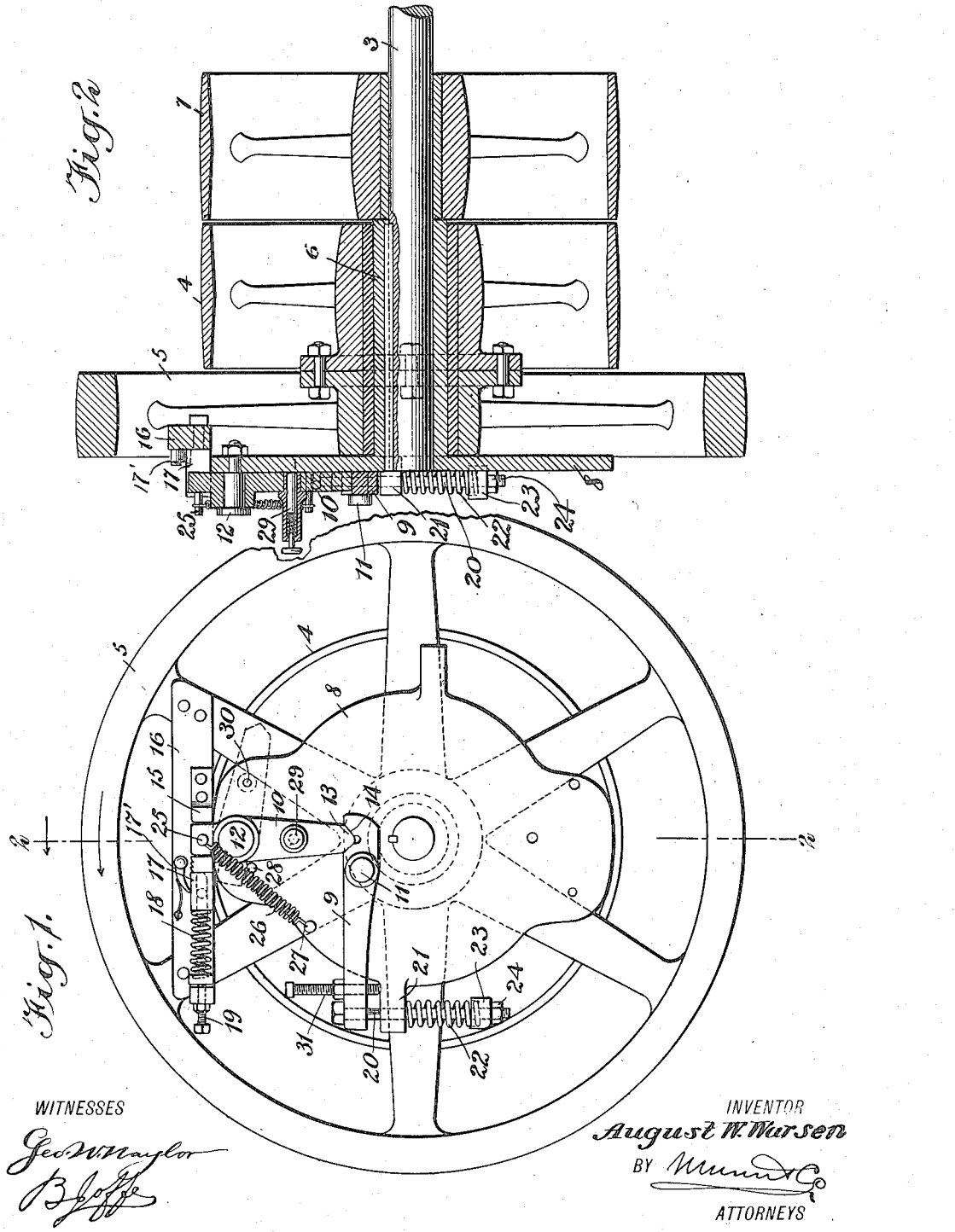

AUGUST W. WARSEN, OF NEW YORK, N. Y.

AUTOMATIC DRIVING LOAD CONTROL.

1,145,724.     Specification of Letters Patent.     Patented July 6, 1915.

Application filed June 2, 1914. Serial No. 842,491.

*To all whom it may concern:*

Be it known that I, AUGUST W. WARSEN, a citizen of the United States, and a resident of the city of New York, borough of Brooklyn, in the county of Kings and State of New York, have invented a new and Improved Automatic Driving Load Control, of which the following is a full, clear, and exact description.

My invention relates to power transmission means, and has reference more particularly to coupling means connecting the driven and driving member, whereby an increase in load on the driven member is prevented by an automatic uncoupling of said driven and driving means.

An object of the invention is to provide a simple, strong and inexpensive contrivance which will prevent the transmission of a higher torque than a predetermined one and which will automatically uncouple the driven member from the driving member and prevent damage to the moving parts.

A further object of the invention is to provide a device of the class described in which the resilient means do not come into action until the torque begins to exceed the predetermined one.

With the above and other objects in view, the nature of which will more fully appear as the description proceeds, the invention consists in the novel construction, combination and arrangements of parts as herein fully described, illustrated and claimed.

In the accompanying drawings forming part of the application, similar characters of reference indicate corresponding parts in both views, and Figure 1 is a face elevation of an embodiment of my invention; and Fig. 2 is a vertical section on line 2—2, Fig. 1.

Referring to the drawings, 3 represents a shaft to be driven by means of a pulley 4 made rigid with a fly-wheel 5 by any suitable means. The pulley and fly-wheel are mounted to rotate on a sleeve 6 keyed to the shaft 3. A loose pulley 7 is mounted adjacent the fixed pulley 4. The end of the sleeve adjacent the fly wheel 5 has a lateral flange 8 which is rigid with the sleeve and is adapted to bear against the hub of the fly wheel.

Pivotally mounted on the exterior face of the flange 8 is a pair of first-class levers 9 and 10, preferably at right angles to each other, the fulcrum of the lever 9 being formed by a stud 11 secured to the flange, and that of the lever 10, by a stud 12 also carried by the flange. The end 13 of the long arm of the lever 10 engages a V-shaped notch 14 in the shorter arm of the lever 9. The short arm of the lever 10 abuts at one side against a fixed lug 15 carried by a bar 16 suitably secured to the fly wheel 5. The other side of the short arm of the lever 10 is engaged by a lug 17 mounted to slide on a bar 16, which lug is maintained against the short arm of the lever 10 by a resilient member 18, the compression of which may be varied by a screw 19 provided on the bar. This arrangement prevents the running ahead of the driven member. The pawl 17' is to prevent the return of the lug 17 after it has been moved by the lever 10.

The end of the long arm of the lever 9 is engaged by a bolt 20, which bolt passes through a lug 21 integral with the flange 8. The bolt 20 carries a compression spring 22, one end of which abuts against the lug 21, while the other end engages a cup 23 which may be adjusted on the bolt by means of a nut 24 whereby the compression of the spring 22 can be varied. This spring 22 controls the engagement between the levers 9 and 10 and, therefore, the torque to be transmitted from the pulley 4 to the shaft 3. That is to say, when the shaft 3 is overloaded by some cause the lever 10 will snap out of the lever 9 by compressing the spring 22, *i. e.*, by moving the bolt 20 in the lug 21 until the end 13 of the lever 10 will snap out of the recess 14. The movement of the lever 10 on the stud 12 will slide the lug 17 toward the screw 19 compressing the same until the short arm of said lever is able to pass said lug. To prevent interference between the lugs 15 and 17 and the lever 10, after the same has been disconnected therefrom the short arm of said lever is provided with a pin 25 engaged by one end of the spring 26, the other end of said spring being connected to a stud 27 carried by the flange. The tendency of this spring, as can be seen from Fig. 1, is to move the short lever 10 against a pin 28 provided on the flange 8. To further insure that there will be no displacement of the lever 10 after the same has been disengaged from the lever 9, a spring-actuated plunger 29 is provided on the longer arm of the lever 10 which is adapted to engage a recess 30 provided in the flange 8 when said lever is brought against the pin 28 by the spring 26. To prevent vibration of the lever 9, that may be set up by the spring 22, the same, adjacent the bolt 20, is provided with a set screw 31 adapted to engage the lug 21 of the flange 8.

Although the drawing shows only one pair of levers 9 and 10, more pairs of levers can be provided on the flange 8, in which case the other accessories for the levers will be provided accordingly. It is self-evident that where only one pair of levers is used proper balancing means are provided on the fly-wheel 5 and on the flange 8.

It will be noted that the lever 10 has its fulcrum or pivot 12 parallel to and in the plane with the axis of the shaft 3, and that the axis of said lever 10 is in the plane passing through the axes of the fulcrum and the shaft 3 when said lever engages the lever 9. By placing the lever 10 as stated, the vibration that may be caused by the yielding engagement of said levers is reduced to a minimum and only a slight excess of load on the shaft 3 will separate the levers 9 and 10.

From the foregoing description, taken in connection with the accompanying drawings, the advantage of the construction and operation of the device shown will be readily understood by those skilled in the art to which the invention pertains; and while I have described the principle of operation, together with the device which I now consider to be the best embodiment thereof, I desire to have it understood that the device shown is merely illustrative and that such changes may be made when desired as are within the scope of the appended drawings.

Having thus described my invention, I claim as new and desire to secure by Letters Patent:

1. In a device of the class described, the combination of a driving and a driven member, a pair of angularly disposed levers of the first class carried by the driven member whereby the torque from the driving member is transmitted to the driven member, means yieldingly connecting the said angularly disposed levers, means associated with the driving member and one of said levers whereby the driven member is prevented from running ahead of the driving member, and means for locking said last mentioned lever to the driven member when said pair of levers have been disconnected substantially as and for the purpose set forth.

2. In a device of the class described, the combination of a driving and a driven member; angularly disposed levers of the first class carried by the driven member, said levers having unequal arms, the short arm of one of said levers being engaged by the long arm of the other of said levers; resilient means associated with the long arm of the lever, of which the short arm is engaged by the other lever, whereby said levers are yieldingly connected to each other, the short arm of said second lever being adapted to be engaged by the driving member, whereby the torque from the driving member is transmitted to the driven member; and means associated with said second lever whereby the same is locked to the driven member when it has been disengaged from the driving member.

3. In a device of the class described the combination of a driving and a driven member, a pair of angularly disposed levers of the first class carried by the driven member, means on the driving member engaging one of said levers whereby the torque from the driving member can be transmitted to the driven member, resilient means associated with the other lever whereby said levers are yieldingly connected to one another and whereby only a predetermined torque can be transmitted from the driving to the driven member, and means associated with the driving member normally engaging said lever engaged by said driving member whereby the driven member is prevented from running ahead of the driving member.

4. In a device of the class described the combination of a driving and a driven member, a pair of interengaging levers of the first class at right angles to each other carried by the driven member, means carried by the driving member normally engaging one of said levers whereby the driving and driven members are coupled, resilient means associated with the other lever whereby the engagement between the two levers is normally maintained and whereby a torque, not exceeding a predetermined one, can be transmitted from the driving to the driven member, and means on the driving member yieldingly engaging the lever engaged by said driving member whereby the driven member is prevented from running ahead of the driving member.

5. In a device of the class described the combination of a driving and a driven member, a pair of interengaging levers of the first-class at right angles to each other carried by the driven member, resilient means associated with one of the levers and said driven member whereby a yielding engagement between the levers is maintained, means carried by the driving member adapted to engage the other lever whereby the driven and the driving members are coupled, resilient means engaging said last mentioned lever and carried by said driving member whereby the driven member is prevented from running ahead of the driving member, and means for locking said last mentioned lever in a predetermined position on said driven member when the same has been disengaged from the other lever.

6. In a device of the class described the combination of a driving and a driven member, a pair of interengaging levers of the first class at right angles to each other carried by said driven member, said levers having unequal arms, one of said levers having a V-shaped notch interengaged by the long arm of the other of said levers, resilient means associated with the long arm of the lever having a notch and whereby said levers are yieldingly connected, a bar carried by the driving member having means engaging the short arm of the other lever whereby the torque from the driving member is transmitted to the driven member, a member slidably mounted on said bar, and a resilient member normally maintaining said member against said short arm associated with the driving member and whereby the driven member is prevented from running ahead of the driving member, and locking means, associated with said last mentioned lever, becoming operative when said lever is disengaged from the V-shaped notch.

7. In a device of the class described the combination of a driving and a driven member, a pair of angularly disposed levers of the first class carried by the driving member, resilient means associated with one of the levers whereby the said levers are yieldingly connected to one another, said driving member having means engaging the other of said levers, and locking means associated with said second lever whereby said lever is prevented from interference with said driving member when said lever is disengaged from the first lever, said locking means becoming operable after said lever has been disengaged from the lever associated with the resilient means.

In testimony whereof I have signed my name to this specification in the presence of two subscribing witnesses.

AUGUST W. WARSEN.

Witnesses:
BENEDICT JOFFE,
PHILIP D. ROLLHAUS.